(12) United States Patent
Zhang et al.

(10) Patent No.: US 9,239,395 B2
(45) Date of Patent: Jan. 19, 2016

(54) METHOD AND SYSTEM OF DETERMINING EARTHQUAKE PARAMETERS, EARTHQUAKE SEARCH ENGINE

(75) Inventors: Jie Zhang, Anhui (CN); Haijiang Zhang, Anhui (CN); Enhong Chen, Anhui (CN); Yi Zheng, Anhui (CN); Wenhuan Kuang, Anhui (CN)

(73) Assignee: University of Science and Technology of China, Hefei, Anhui (CN)

( * ) Notice: Subject to any disclaimer, the term of this patent is extended or adjusted under 35 U.S.C. 154(b) by 728 days.

(21) Appl. No.: 13/578,514

(22) PCT Filed: May 24, 2012

(86) PCT No.: PCT/CN2012/075980
§ 371 (c)(1),
(2), (4) Date: Aug. 10, 2012

(87) PCT Pub. No.: WO2013/143222
PCT Pub. Date: Oct. 3, 2013

(65) Prior Publication Data
US 2013/0261982 A1    Oct. 3, 2013

(30) Foreign Application Priority Data
Mar. 31, 2012 (CN) .......................... 2012 1 0101264

(51) Int. Cl.
*G01V 1/28* (2006.01)
*G01V 1/00* (2006.01)

(52) U.S. Cl.
CPC ...................... *G01V 1/008* (2013.01)

(58) Field of Classification Search
CPC ................. G06F 17/30; G01V 1/008
See application file for complete search history.

(56) References Cited

U.S. PATENT DOCUMENTS

| | | | | |
|---|---|---|---|---|
| 4,980,644 A | * | 12/1990 | Todorov | 324/345 |
| 5,270,649 A | * | 12/1993 | Laukien | 324/300 |
| 5,490,062 A | * | 2/1996 | Leach et al. | 702/15 |

FOREIGN PATENT DOCUMENTS

| | | |
|---|---|---|
| CN | 102200999 A | 9/2011 |
| JP | 2000-131452 | 5/2000 |

OTHER PUBLICATIONS

McCloskey et al., "Heterogeneity and Earthquake magnitude-frequency distribution," Apr. 1, 1999, Geophysical Resarch Letter, vol. 26, No. 7, pp. 899-902.*

Peng Wang et al., *Design and Application of Analogical Seismic Database System*, Computer Engineering, vol. 28, No. 5, May 2002, pp. 272-274.

(Continued)

*Primary Examiner* — Elias Desta
(74) *Attorney, Agent, or Firm* — Workman Nydegger

(57) ABSTRACT

Methods for rapidly determining earthquake parameters of an earthquake include inputting a seismogram of the earthquake, searching concurrently in pre-established historical seismogram database and theoretical seismogram database by use of an approximate nearest neighbor search method, to find a set of seismograms similar to the input seismogram according to a preset similarity condition, and determining from the set of similar seismograms one or more seismograms matched with the input seismogram, and determining the earthquake parameters from the matched seismograms. With the present invention, it is possible to search in millions of seismograms and determine parameters for an earthquake in a few second, and thus realize rapid and even real-time estimation of earthquake parameters.

20 Claims, 13 Drawing Sheets

(56) References Cited

OTHER PUBLICATIONS

International Search Report and Written Opinion dated Jan. 3, 2013, issued in PCT Application No. PCT/CN2012/075980, filed May 24, 2012.
Michael Bouchon et al., *Extended Nucleation of the 1999 $M_w$ 7.6 Izmit Earthquake*, Sciences, vol. 331, Feb. 18, 2011, pp. 877-888.
Yan Xu et al., *Source Parameters of Regional Small-To-Moderate Earthquakes in the Yunnan-Sichuan Region of China*, Bulletin of the Seismological Society of America, vol. 100, No. 5B, Nov. 2010, pp. 2518-2531.
Jessie Bonner, et al., *Variable-Period Surface-Wave Magnitudes: A Rapid and Robust Estimator of Seismic Moments*, Bulletin of the Seismological Society of America, vol. 100, No. 5A, Oct. 2010, pp. 2301-2309.
Malcolm Slaney et al., *Locality-Sensitive Hashing for Finding Nearest Neighbors*, IEEE Signal Processing Magazine, Mar. 2008, pp. 128-131.
Robert Herrmann, *Some Aspects of Band-Pass Filtering of Surface Waves*, Bulletin of the Seismological Society of America, vol. 62, No. 2, Apr. 1973, pp. 663-671.
Wei Zhang et al., *Traction Image Method for Irregular Free Surface Boundaries in Finite Difference Seismic Wave Simulation*, Geophysical Journal International, 2006, vol. 167, pp. 337-353.
Adam Dziewonski et al., *Preliminary Reference Earth Model*, Phys. Earth Planet. Inter., vol. 25, 1981, pp. 297-356.
Marius Muja et al., *Fast Approximate Nearest Neighbors With Automatic Algorithm Configuration*, VISAPP (1) 2009, pp. 331-340.
Chanop Silpa-Anan et al., *Optimised KD-Trees for Fast Image Descriptor Matching*, In CVPR, 2008, 8 pages.

\* cited by examiner

|  | Dim 1 | Dim 2 | Dim 3 | Dim 4 |
|---|---|---|---|---|
| Seismogram ID1 | 0.3 | 0.1 | 0.1 | 0.4 |
| Seismogram ID2 | 0.2 | 0.2 | 0.1 | 0.9 |
| Seismogram ID3 | 0.1 | 0.6 | 0.4 | 0.5 |
| Mean | 0.2 | 0.3 | 0.2 | 0.6 |
| Variance | 0.00667 | 0.04667 | 0.02000 | 0.04667 |

METHOD AND SYSTEM OF DETERMINING EARTHQUAKE PARAMETERS, EARTHQUAKE SEARCH ENGINE

TECHNICAL FIELD

The present invention relates to earthquake monitoring and prediction, and more particularly, to methods and systems of rapidly determining source parameters of an earthquake as well as earthquake search engines.

BACKGROUND

An earthquake refers to a sudden movement of the earth's interior caused by the release of stress accumulated along geologic faults or by volcanic activity. The earthquake may includes various quakes of the earth's interior, such as microseismic events caused by industrial activities, dynamite explosions used in petroleum and natural gas exploration, small or large natural earthquakes, and nuclear explosions.

When an earthquake takes place, its waves are recorded by seismic stations (more specific, earthquake recording instruments), we want to infer and report its location, magnitude, and source focal mechanism as fast as possible. Current state-of-the-art technology in this area can detect an earthquake's location shortly after the occurrence of the earthquake using P- and/or S-wave travel time information, but the source focal mechanism has to be analyzed and becomes available in hours or days after the earthquake. Current technology for locating earthquakes and reporting earthquake magnitude also often requires a certain level of expertise to infer and ensure estimation accuracy. In the case of magnitude 9.1 earthquake occurring on Dec. 26, 2004 off the west coast of Northern Sumatra, it was not reported timely because of holidays. As a result, warning of tsunami was not issued timely, which led to severe damages and injuries. Reporting focal mechanism of an earthquake in real time is important. For example, Bouchon, M., Karabulut, H., Aktar, M., Ozalaybey, S., Schmittbuhl, J., and Bouin, M-P. (2011). Extended nucleation of the 1999 Mw 7.6 Izmit Earthquake, Sciences 331, 877-88 analyzed the extended nucleation of the 1999 Mw 7.6 Izmit earthquake and found a sequence of foreshocks whose focal mechanisms indicating similar fault slips before accelerating to dynamic rupture. Obtaining foreshock focal mechanisms in real time may help to develop early warning system or even predict earthquakes. However, deriving earthquake focal mechanism requires efforts such as waveform modeling and inversions, which are usually performed in the following hours or days after earthquakes, and it often requires advanced modeling and computational efforts.

A method for rapid determination of source parameters of an earthquake is desired.

SUMMARY

According to an embodiment of the present invention, a method of determining earthquake parameters for an earthquake is provided comprising:
  inputting a seismogram of the earthquake, the seismogram including earthquake waveforms;
  searching concurrently in pre-established historical seismogram database and theoretical seismogram database by use of an approximate nearest neighbor search method with waveform matching, to find a set of seismograms similar to the input seismogram according to a preset similarity condition, wherein the historical seismogram database stores seismograms of real earthquakes, and the theoretical seismogram database stores seismograms theoretically calculated; and
  determining from the set of similar seismograms one or more seismograms matched with the input seismogram, and determining the earthquake parameters from the matched seismograms.

According to a further embodiment of the present invention, a system of determining earthquake parameters for an earthquake is provided comprising:
  a historical seismogram database which stores seismograms of real earthquakes;
  a theoretical seismogram database which stores seismograms theoretically calculated;
  an input configured to input a seismogram of an earthquake, the seismogram including earthquake waveforms;
  an earthquake search engine configured to search concurrently in the historical and theoretical seismogram databases by use of an approximate nearest neighbor search method with waveform matching, to find a set of seismograms similar to the input seismogram according to a preset similarity condition, to determine from the set of similar seismograms one or more seismograms matched with the input seismogram, and to determine the earthquake parameters from the matched seismograms.

According to a yet further embodiment of the present invention, an earthquake search engine is provided comprising:
  a search unit configured to searching concurrently in pre-established historical seismogram database and theoretical seismogram database by use of an approximate nearest neighbor search method with waveform matching, to find a set of seismograms similar to an input seismogram including earthquake waveforms according to a preset similarity condition, wherein the historical seismogram database stores seismograms of real earthquakes, and the theoretical seismogram database stores seismograms theoretically calculated; and
  a determination unit configured to determine from the set of similar seismograms one or more seismograms matched with the input seismogram, and determine earthquake parameters from the matched seismograms.

BRIEF DESCRIPTION OF THE DRAWINGS

The above and other objects, characteristics and advantages of the present invention will be more apparent from the following description of example embodiments of the present invention will be illustrated with reference to accompanying drawings, in which.

DETAILED DESCRIPTION OF THE PREFERRED EMBODIMENTS

Example embodiments according to the present invention will be described in detail with reference to the figures, and the present invention is not limited to the following example embodiments. The figures show components, functions or steps relevant to the solutions of the present invention while details of known techniques, functions, components or steps are omitted here, to avoid obscuring the present invention.

Figure 1:
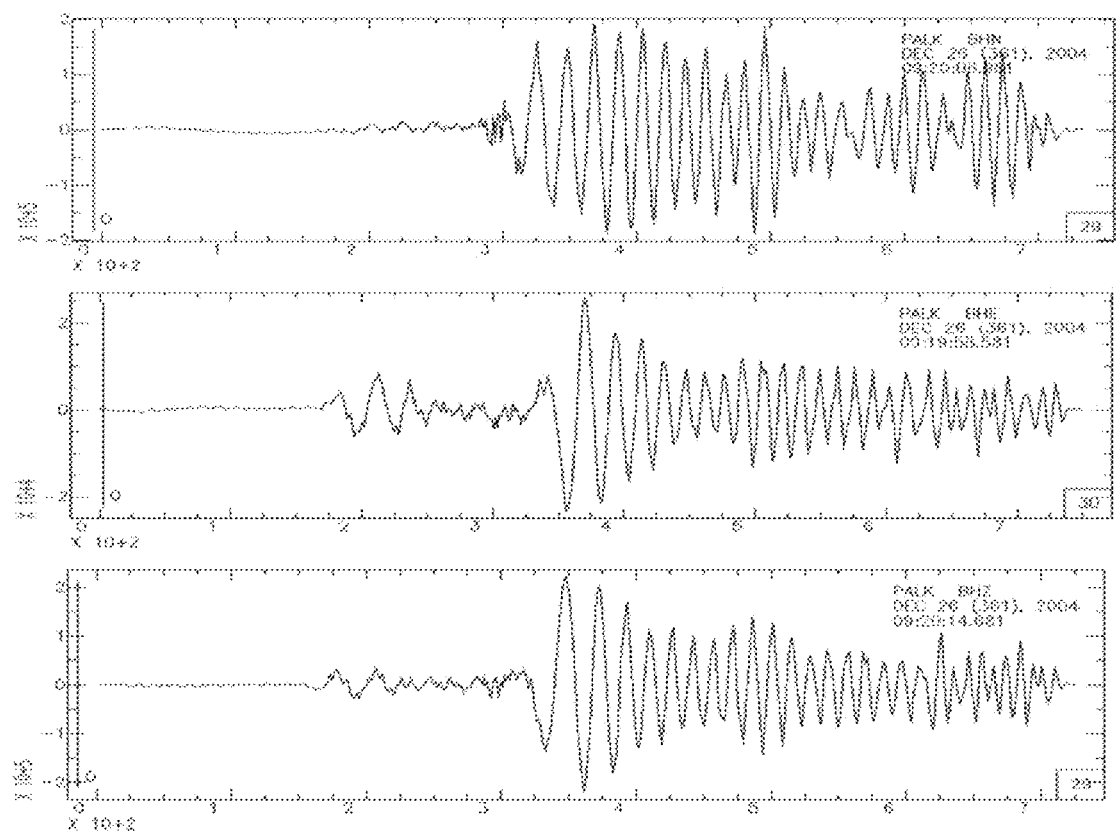
FIG. 1 is an example of a three-component seismogram.

An earthquake event is often caused by sudden breaking of the earth's interior, and may be described with a seismogram containing parameters such as epicenter distance, source depth, source focal mechanism, and/or magnitude. The source focal mechanism may include strike, dip and rake along the breakage. Each earthquake has a different set of these parameters, and accordingly its seismogram has unique waveforms, such as transverse wave, longitudinal wave or surface wave having different characteristics. A seismogram represents a sequence of temporal signals. For a given geological region, each seismogram corresponds to a unique combination of the above parameters. Therefore, it is possible to infer these parameters based on the corresponding seismograms. A seismogram may be represented as a three-component (along vertical, east-west, and north-south directions) data or one-component (along a vertical direction) data. FIG. 1 shows an example of a three-component seismogram. The upper part shows the north-south quake component, the middle part shows the east-west quake component, and the lower part shows the vertical quake component. The horizontal axis represents relative time (in unit of second), and the vertical axis represents the velocity at which the earth's interior is shaking at a location for recording the seismogram, such as a seismic station.

A fundamental assumption in seismic modeling is that if two seismograms recorded at the same station are identical, then their source solutions and the velocity structures that they propagate through should be the same. In seismological studies, therefore, performing forward modeling and inversion to find waveforms that match obtained seismograms is a standard approach to infer earthquake sources and the earth structures. Examples may be found in Xu, Y., Herrmann, R. B., and Keith, D. K. (2010). Source parameters of regional small-to-moderate earthquakes in the Yunnan-Sichuan region of China, Bull. Seismol. Soc. Am. 100, No. 5B, pp. 2518-2531, and Bonner, J., Herrmann. R., and Harley, B. (2010). Variable-period surface-wave magnitudes: a rapid and robust estimator of seismic moments. Bull. Seismol. Soc. Am. 100, No. 5A, pp. 2301-2309.

Figure 2:
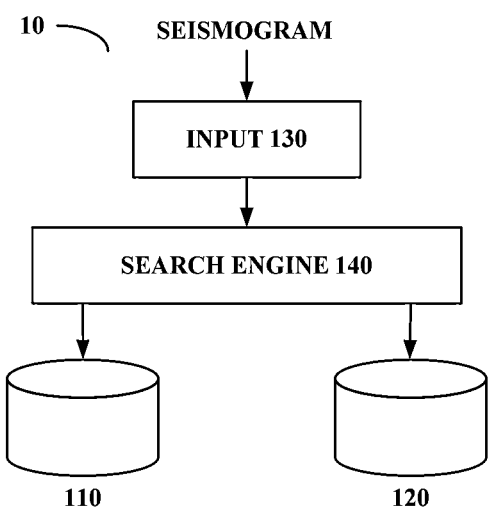
FIG. 2 is a schematic block diagram showing a system of determining earthquake parameters for an earthquake according to an embodiment of the present invention.

For occurrence of an earthquake, embodiments of the present invention can find seismograms similar to the seismogram of the earthquake by rapidly searching in historically recorded seismograms of real earthquakes and seismograms theoretically calculated with, for example, artificial modeling, and determine estimations of earthquake parameters for the happening earthquake. The historically recorded seismograms and the theoretically calculated seismograms may be prepared in advance. According to embodiments of the present invention, the search does not just find one search result; it actually returns a space of solutions with quantitative similarity measurement for each result just like what a web search engine does. This gives us a chance to sort the results according to similarity and examine multiple nonunique solutions in seismic modeling. According to embodiments of the present invention an approximate nearest neighbor searching method may be used, and then we could obtain all of these nonunique solutions in a few seconds right after the occurrence of the earthquake. Multiple solutions should be evaluated for earthquake waveform matching because of noise effects, trade-offs among modeling parameters, and structure heterogeneity in the earth. Uncertainty of the solution can be well defined from these search results FIG. 2 is a schematic block diagram showing a system of determining earthquake parameters for an earthquake according to an embodiment of the present invention. The system 10 may include: a historical seismogram database 110 which stores seismograms of real earthquakes; a theoretical seismogram database 120 which stores seismograms theoretically calculated; an input 130 configured to input a seismogram of an earthquake; and an earthquake search engine 140 configured to search concurrently in the historical and theoretical seismogram databases 110, 120 by use of an approximate nearest neighbor search method, to find a set of seismograms similar to the input seismogram according to a preset similarity condition, to determine from the set of similar seismograms one or more seismograms matched with the input seismogram, and to determine the earthquake parameters from the matched seismograms.

Each of the historical and theoretical seismogram databases 110, 120 may be local or remote, or centralized or distributed.

According to an embodiment, the system 10 may further include an evaluation unit (not shown) configured to evaluate resolution and reliability of search results by comparing a distribution of cross correlation coefficients of all the matched seismograms.

Here, the seismogram may be in the form of three-component waveform signal as shown in FIG. 1, or any other suitable form, such as a single vertical component waveform signal. The seismogram may be digitalized and recorded, and may be stored in a standard format, such as SAC, SEG2, SEGD or SEGY. In the head of a data file, there may store earthquake parameters recognized by the International Earthquake Organization, including epicenter distance, source depth, source focal mechanism, and/or magnitude, as an example. The source focal mechanism may include strike, dip and/or rake.

Historical Seismogram Database 110

Figure 3:
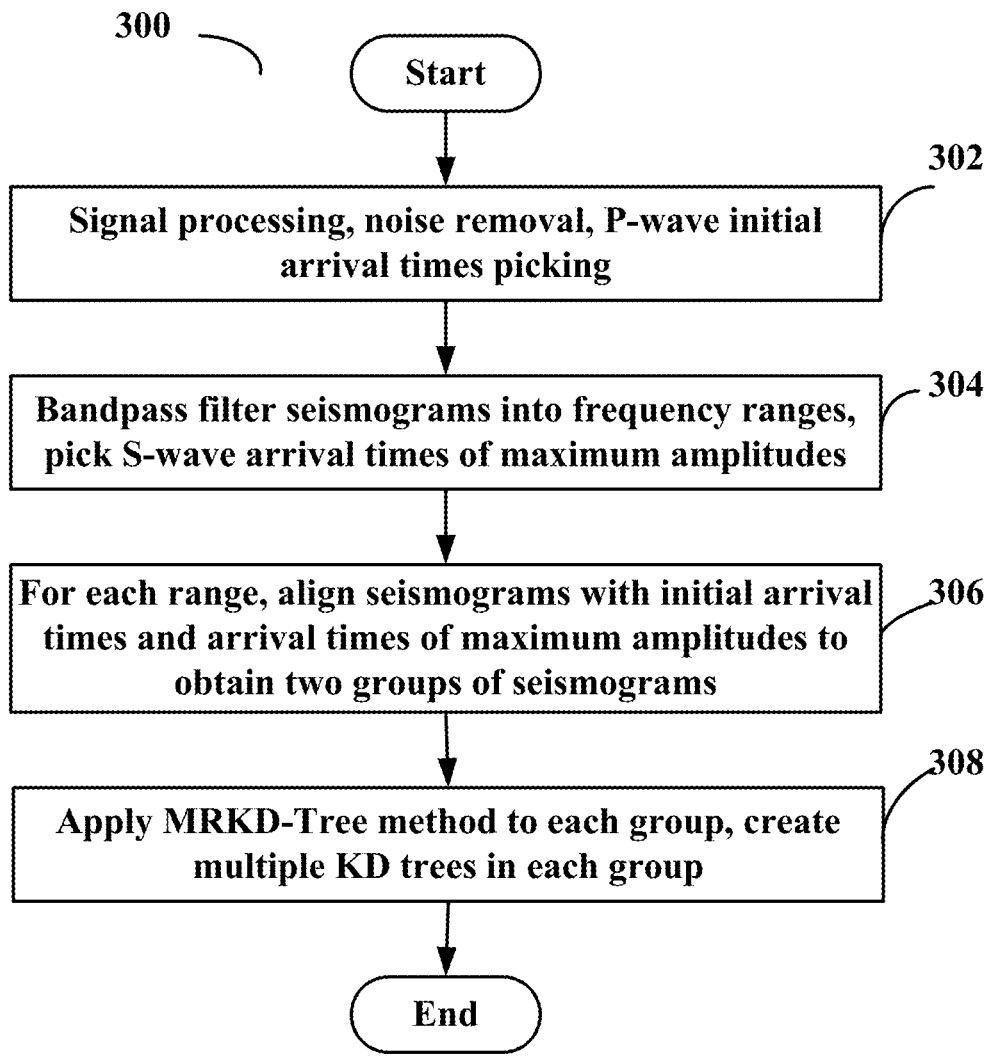
FIG. 3 is a schematic flowchart showing a process of establishing a historical seismogram database.

The historical seismogram database 110 may be pre-established. Digitalized recordings of real earthquakes from a single seismic station or various seismic stations may be used in establishing the historical seismogram database 110. The database may be established for certain geographical region, geological formation and/or a network of seismic stations. The database may be also established with a large-scale regional and/or teleseismic earthquake data, for example, according to their epicenter distance, source depth, and source focal mechanism. According to an embodiment, digitalized recordings of real earthquakes from a seismic station may be stored separately from those from another seismic station in the database. Estimations of earthquake parameters may be determined individually for each seismic station by using the digitalized recordings from this seismic station, and then final estimations may be determined as an intersection of the earthquake parameters from all the seismic stations. In an embodiment, the recordings of seismograms in the historical seismogram database 110 may be indexed so that they can be searched by a Locality Sensitive Hashing (LSH) method or a Multiple Randomized K-Dimensional (MRKD) Tree method. The LSH method is a fast search method for document and image retrieval commonly used in the field of computer science. Details of the method may be referred to, for example, Slaney, M., and Casey, M. (2008), Locality-sensitive hashing for finding nearest neighbors, IEEE Signal Processing Magazine, March, pp 128-131. FIG. 3 shows a schematic flow chart 300 of establishing the historical seismogram database 110 according to an embodiment, in which the recordings of seismograms may be indexed with the MRKD-Tree method so that a MRKD-Tree search method may be performed on the indexed seismograms. As shown in FIG. 3, at step 302, the seismograms obtained from one or more seismic stations may be subjected first to conventional signal processing, such as noise removing, and then P-wave initial arrival times may be obtained for each of the seismograms. At step 304, the seismograms may be filtered with band-pass filters having different passband frequency ranges, and thus divided into multiple frequency ranges. The frequency ranges may be selected as, for example, [0.01 Hz, 0.04 Hz], [0.03 Hz, 0.06 Hz]. Then, the S-wave maximum amplitude of each filtered seismogram is obtained. In this way, it is possible to remove instrument responses of individual seismic stations from the seismograms. (Reference may be made to Herrmann, R. (1973). Some aspects of band-pass filtering of surface waves. Bull. Seismol. Soc. Am. 63, No. 2, pp. 663-671.) At step 306, for each frequency range, the waveforms of the seismograms are aligned based on their initial arrival times and their maximum amplitudes, to create two different groups of seismograms. At step 308, each of the two groups may be processed by the MRKD-Tree method to create one or more K-Dimensional (KD) trees. In this way, a historical seismogram database is established in which seismograms are indexed in a MRKD-Tree structure. In an embodiment, a combination of the MRKD-Tree method and the approximate nearest neighbor search method may be used for searching in such seismogram database.

Figure 5:
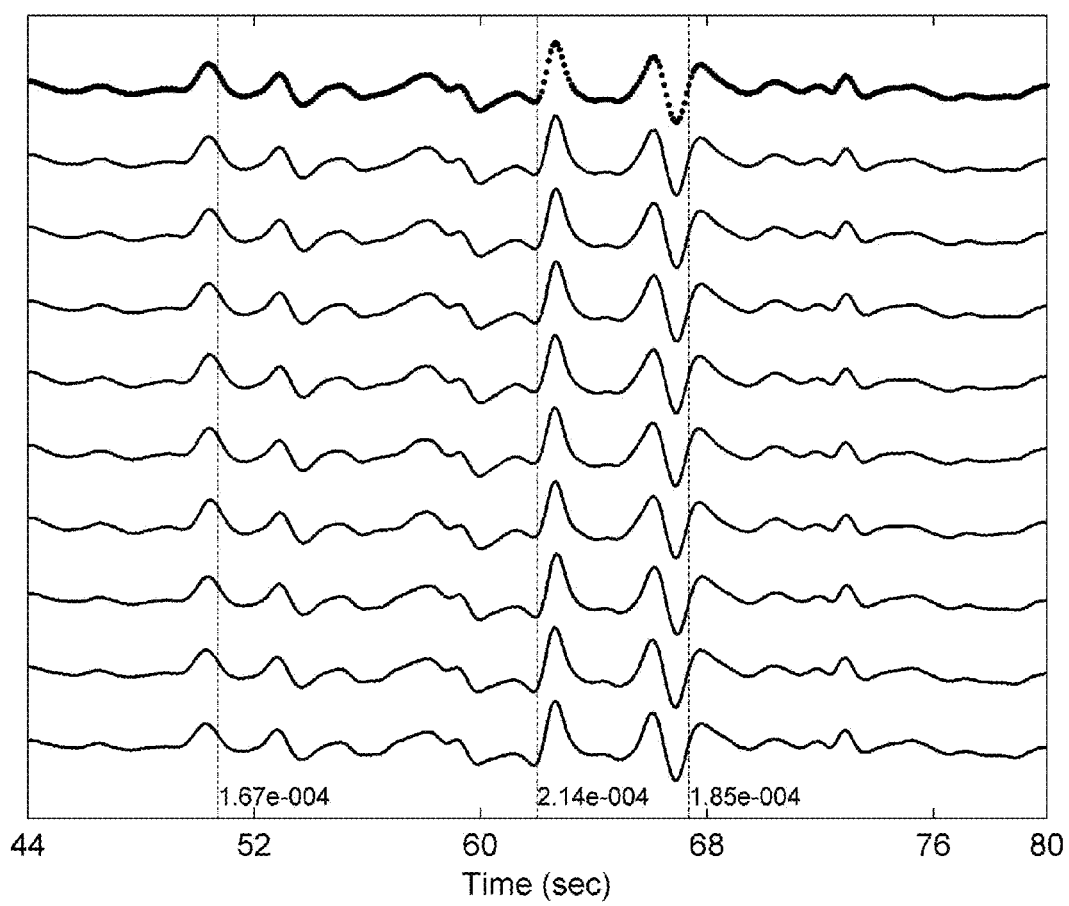
FIG. 5 is an example of a seismogram having multiple dimensions in a time domain.
Figure 6:
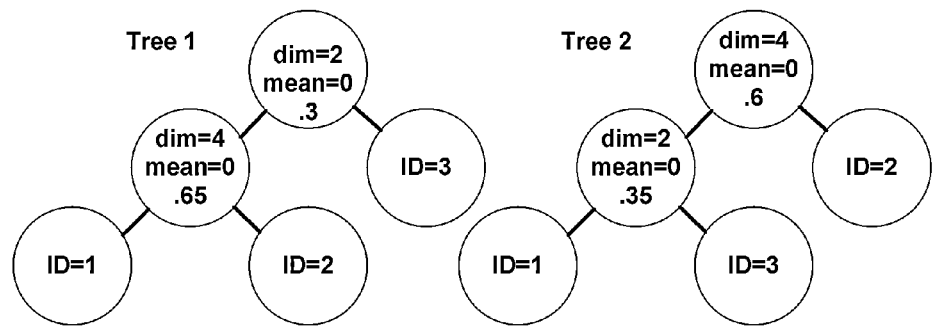
FIG. 6 is a schematic diagram showing a process of establishing a Multiple Randomized K-Dimensional Tree (MRKD-Tree) structure.

In an embodiment, the seismograms may be multi-dimensional data. Here, each "dimension" may refer to a particular time period, and thus may be referred to as temporal dimension. Seismogram data at each dimension may represent temporal samples of a seismogram during the particular time period. Creating one or more KD trees in a group of seismograms may be implemented by calculating a mean value and a variance of amplitudes of the seismograms at each dimension; determining one or more dimensions where the variances are largest relative to the mean values; for each of the one or more determined dimensions, dividing the seismograms into a left half and a right half with the mean value of the dimension being a median, wherein the left half includes the seismograms whose amplitudes are smaller than the mean value, and the right half includes the seismograms whose amplitudes are larger than the mean value; for each of the left and right halves, iteratively perform said calculating, determining and dividing, until each half includes only a single seismogram. Below an example of using the MRKD-Tree method to create one or more KD trees in a group of seismograms will be described with reference to FIGS. 5 and 6. FIG. 5 shows waveforms of 10 seismogram samples in three temporal dimensions where the variances are larger. As shown, the seismograms are aligned according to their initial arrival times, and the variances are mean square deviations having values of 1.67e-004, 2.14e-004, and 1.85e-004, respectively. Embodiments of the present invention are not limited to this example, and may have less or more temporal dimensions. Alternatively, variances may be first calculated for all temporal dimensions, and then several temporal dimensions where the variances are larger than the other temporal dimensions may be selected and used. FIG. 6 shows a schematic process of creating the MRKD-Tree structure. As shown, the database has three seismograms stored, each having four dimensions. The table of FIG. 6 shows the mean values and mean square deviations of amplitudes of the seismograms at each dimension. The mean square deviation may be calculated with Equation (1):

$$\sigma(t) = \sqrt{\frac{\sum_{i=1}^{N}(A_i(t) - \alpha(t))^2}{N}} \quad (1)$$

Here, $A_i(t)$ represents the amplitude of the i-th seismogram at dimension t in the database, $\alpha(t)$ represents the mean value of all the seismograms at the dimension t, and N represents the number of all the seismograms in the database. As shown in the table, the maximal mean square deviation 0.04667 appears at both of the dimensions 2 and 4. Then creating the MRKD-Tree structure may be begun with the dimensions 2 and 4 simultaneously. At the dimension 2, if a seismogram has an amplitude value less than the mean value 0.3, the seismogram will be placed at the left half of a tree. Otherwise, if the seismogram has an amplitude value not less than the mean value 0.3, it will be placed at the right half of the tree. In this way, the seismograms are divided into two parts at the dimension 2. The above process may be repeated in each of left and right halves of the tree, until there is only one seismogram left in each half. The process of creating the MRKD-Tree structure at the dimension 4 may be similar to the above process at the dimension 2, and finally the MRKD-Tree structures may be created as Tree 1 and Tree 2 shown in the lower part of FIG. 6.

During the above creation of the MRKD-Tree structure for each group of seismograms, all the seismograms are divided into two parts at each dimension having the maximal variance value. That is, a space defined by all the seismograms is split into two sub-spaces. Then the dividing of seismograms is repeated in each sub-space, until one or more balanced binary trees are created.

Theoretical Seismogram Database 120

Seismograms of real earthquakes have limited coverage on the earth. A new earthquake may or may not be similar to any historical earthquake event. Sometimes it is difficult to find a similar seismogram by searching in the seismograms of real earthquakes, since the historical database may not contain sufficient recordings of seismograms. Embodiments of the present invention use theoretically calculated seismograms as supplement to the real seismograms for more comprehensive coverage on the earth. In an embodiment, a theoretical seismogram database may be pre-established, for example, the database 120 as shown in FIG. 2. Search for a seismogram similar to or matching a new earthquake may be performed concurrently in both of historical and theoretical seismogram databases, and results returned from both databases may offer significant information to help estimate earthquake parameters for the new earthquake. In an embodiment, search is performed independently in each of the historical and theoretical seismogram databases. The seismograms recorded in the historical database are for real earthquakes and do not involve any assumption of simplification of the earth's conditions, while the seismograms recorded in the theoretical database are calculated or synthesized under various assumptions of simplification of the earth's conditions. Therefore, it is preferable to separately handle seismograms from each database, instead of mixing them together. In an embodiment, if the seismogram of a happening earthquake has similar or matched seismograms from the historical and theoretical seismogram databases, and these seismograms are almost identical or very close to each other, the seismograms from the historical seismogram database are selected for the final earthquake parameters.

To prepare a sufficient theoretical seismogram database, we need to calculate millions to billions of synthetic seismograms. The characteristic parameters of a seismogram, such as time difference between traverse and longitude waves, frequency spectrum of surface wave, difference in time periods for recording, will vary with distance between an epicenter and a location where the seismogram is recorded. For monitoring a local area, a 3D earth model may be used to calculate short-wavelength (i.e., high frequency) seismograms, for example, using 3D finite-difference or finite-element simulation methods for a grid of source parameters, epicenter distances, and source depths. Such methods may be found in Zhang, W., and X. Chen. 2006. Traction image method for irregular free surface boundaries in finite difference seismic wave simulation. Geophysical Journal International 167(1): 337-353. For regional or teleseismic distance earthquakes, a general 1D earth model may be used to compute long-wavelength (i.e., low frequency) seismograms, for example, using elastic wave simulation methods. The 1D earth model method may be found in Dziewonski, A. M. and Anderson, D. L., (1981), Preliminary reference earth model. Phys. Earth Planet. Inter., 25: 297-356. In either of the cases, all of the seismograms may be aligned with the initial arrival times or with the arrival times of the maximum amplitudes. In an embodiment, earthquake parameters may be gridded over selected ranges, and for each grid, theoretical seismograms may be calculated. For example, the gridding may be performed on a region of an epicenter distance of 10° to 35° (1°≈111 km) and a source depth of 0 to 50 km, each grid corresponding to an interval of 5 km in the epicenter distance, an interval of 5 km in the depth, an interval of 10° in each of strike, dip and rake. The theoretically calculated seismograms may also be stored in various formats, such as SAC.

Figure 4:
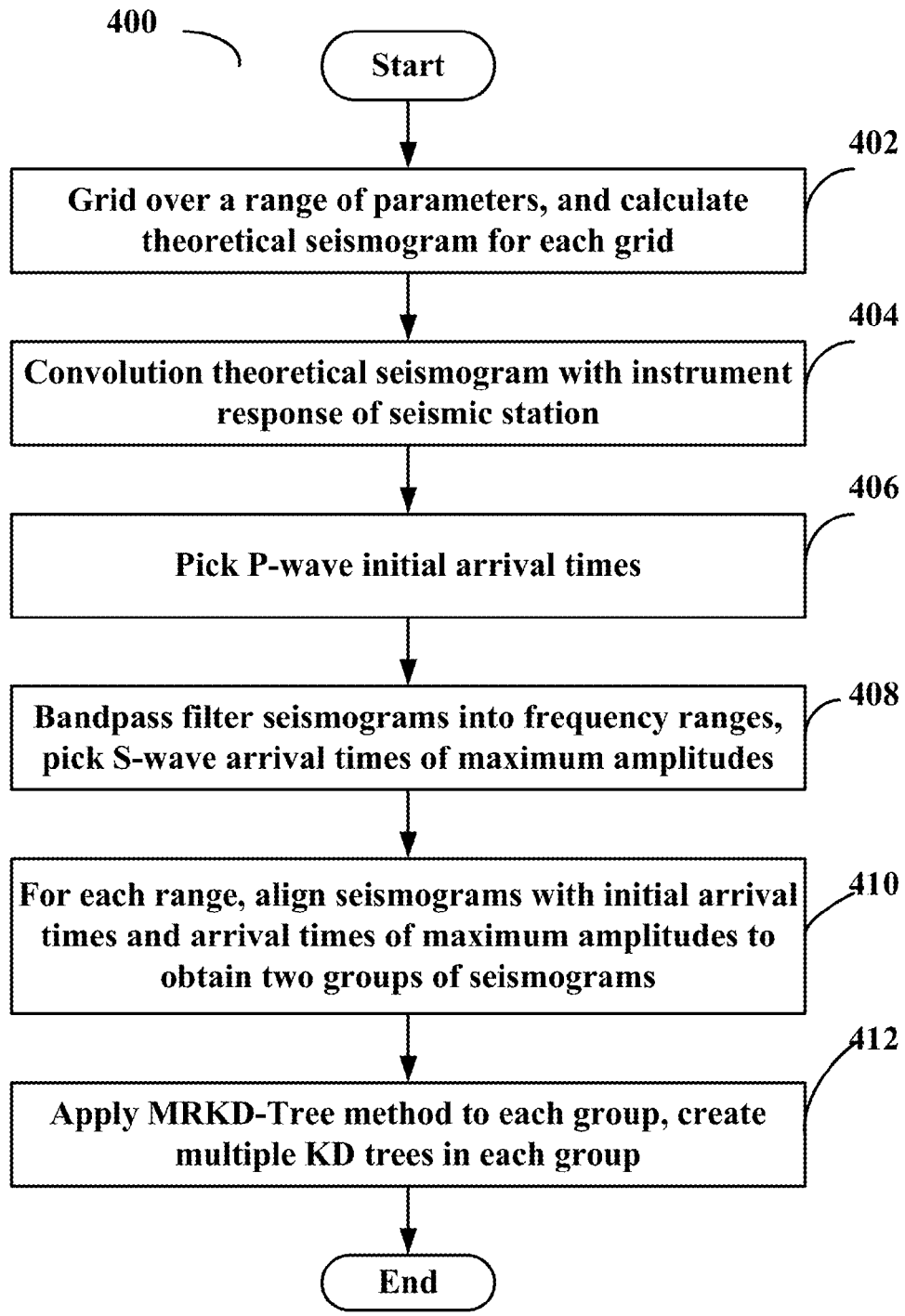
FIG. 4 is a schematic flowchart showing a process of establishing a theoretical seismogram database.

FIG. 4 is a schematic flowchart 400 showing a process of establishing a theoretical seismogram database according to an embodiment, in which the recordings of seismograms may also be indexed with the MRKD-Tree method. As shown in FIG. 4, at step 402, earthquake parameters may be gridded over selected ranges, so that theoretical seismograms are calculated individually for each grid. At step 404, the calculated seismograms are subjected to convolution with instrument response of a particular seismic station so that the theoretical seismograms may be comparable to real seismograms, since the recorded seismograms for real earthquakes usually have convolution effect due to instrument response of a particular seismic station. At step 406, P-wave initial arrival times may be obtained for each of the seismograms. At step 408, the seismograms may be filtered with band-pass filters having different passband frequency ranges, and thus divided into multiple frequency ranges. Then, the maximum amplitude arrival times of each filtered seismogram are obtained. At step 410, for each frequency range, the waveforms of the seismograms are aligned based on their initial arrival times and their maximum amplitude arrival times, to create two different groups of seismograms. At step 412, each of the two groups may be processed by the MRKD-Tree method to create one or more KD trees. In this way, a theoretical seismogram database is established in which seismograms are indexed in a MRKD-Tree structure. The creation of MRKD-Tree structure in the theoretical seismogram database is similar to that in the historical seismogram database.

Input 130

The input 130 may be an interface for inputting the seismogram of a happening earthquake, and may be connected to, for example, an output or communication interface of one or more seismic stations to receive recordings of seismograms from the seismic station(s). The input 130 may include a user interface such as a keyboard or a touch screen. The user or operator may entry setup information, preset condition and like for control and management into the system 10 via the input 130. The input 130 may be realized in any appropriate structure or form.

Search Engine 140

The search engine 140 may be located separately from or at the same position as one or more of the historical and theoretical seismogram databases 110, 120 and the input 130. The search engine 140 may be implemented with a microprocessor, a Field Programmable Gate Array or a dedicated computing device.

A sufficient earthquake database may include hundreds of millions to billions of seismograms. Even with state-of-the-art computer facility, we do not have the processing power to search such huge amount of data with the existing linear search method. Fortunately, a computer search technique known as approximate nearest neighbor search (e.g., Muja, M., Lowe, D. G. (2009). Fast approximate nearest neighbors with automatic algorithm configuration, VISAPP (1) 2009: 331-340) allows one to perform rapid search in a large-scale database with expected accuracy, and it has been successfully applied to retrieve image, music, and videos, etc., from internet-sized data.

Figure 9:
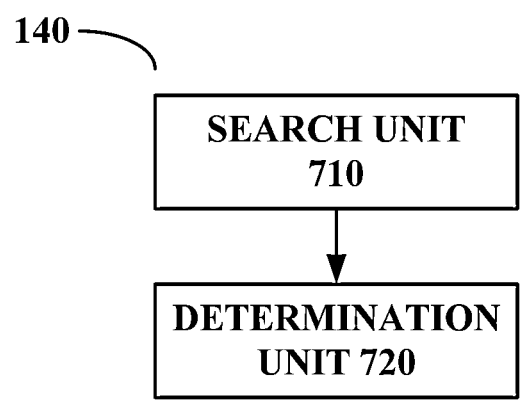
FIG. 9 is a schematic block diagram showing an earthquake search engine according to an embodiment of the present invention.

The search engine 140 may be configured to search concurrently in the historical and theoretical seismogram databases 110, 120 by use of the approximate nearest neighbor search method, to find a set of seismograms similar to the input seismogram according to a preset similarity condition. For example, the preset similarity condition may be a preset search accuracy represented by a percentage, such as 90%. If a seismogram has a similarity not less than 90% to the input seismogram, this seismogram will be put into the set of similar seismograms as search results. In an embodiment, the search engine 140 may further incorporate the LSH or MRKD-Tree method to accelerate the search process. FIG. 9 shows a schematic diagram of the search engine 140 according to the embodiments. The search engine 140 may includes a search unit 710 and a determination unit 720. The search unit 710 may be configured to search concurrently in the historical seismogram database 110 and theoretical seismogram database 120 by use of an approximate nearest neighbor search method, to find a set of seismograms similar to a seismogram inputted from the input 130, according to a preset similarity condition. The determination unit 720 may be configured to determine from the set of similar seismograms one or more seismograms matched with the input seismogram, and determine earthquake parameters from the matched seismograms. In an embodiment, the system 10 may further include an output (not shown) coupled to the search engine 140 and outputting the estimations of earthquake parameters obtained by the search engine 140. The output may be a display screen, a speaker and the like.

In an embodiment, the search unit 710 may perform approximate nearest neighbor search on each group of seismograms in the historical and theoretical databases, respectively, according to a preset similarity condition (e.g., a preset search accuracy of 90%), to obtain a plurality of search results for each database. For each database, the search unit 710 may put these search results in a priority queue, in which the search results are sorted in a descending order of similarity. The search unit 710 may take several (e.g., 20) results at the head part of the queue as the found similar seismograms, which may be considered as a subset of all the seismograms in each database. In an embodiment, the similarity used in sorting the search results may be measured with Euclidian distance between the seismogram of the input earthquake event and each result, i.e., a difference between two seismograms. The smaller the Euclidian distance is, the higher the similarity is.

Because of potential errors of relative mismatch in time among the seismograms selected as search results, sorting of these seismograms in the similarity order may not be accurate enough. In an embodiment, similarity may be based on a cross correlation coefficient of a seismogram with the seismogram of the input earthquake event. A (normalized) cross correlation coefficient may be calculated as follows:

$$r(j) = \frac{\sum_{i=1}^{N}[(x(i)-mx)*(y(i-j)-my)]}{\sqrt{\sum_{i=1}^{N}(x(i)-mx)^2}\sqrt{\sum_{i=1}^{N}(y(i-j)-my)^2}} \quad (2)$$

x(i) and y(i) each represent a seismogram in the form of a time sequence of values, and have N discrete values (i=1,2, 3, . . . N). mx represents the mean value of the sequence x(i), and my represents the mean value of the sequence y(i). The resulting time sequence r(j) (j=1,2, . . . N) have values in the range of [−1, +1]. The greater the value is, the more similar the seismogram is to the input seismogram. Although cross correlation calculation is more time and resource consuming than calculation of Euclidean difference, it is far more accurate than the latter. In the embodiment, the cross correlation calculation is performed only on the subset of seismograms, which is much smaller than the whole database. Therefore, it does not take much time to complete the cross correlation calculation.

In an embodiment, the determination unit 720 may determine the matched seismograms by, for each group in each of the historical and theoretical seismogram databases, calculating a cross correlation coefficient between each of the seismograms selected as approximate nearest neighbors and the input seismogram, and determining one or more seismograms having the largest cross correlation coefficient as the matched seismograms. If the search unit 710 has created a priority queue in which the seismograms selected as approximate nearest neighbors is sorted according to their cross correlation coefficients, the determination unit 720 may select from the priority queue one or more seismograms having the largest cross correlation coefficient as the matched seismograms. If the cross correlation coefficients between the input seismogram and the matched seismograms from the historical and theoretical seismogram databases, respectively, are almost identical or very close (e.g., a difference between them is less than a preset threshold), the determination unit 720 may select the matched seismograms from the historical seismogram database for the final earthquake parameters.

Figure 10:
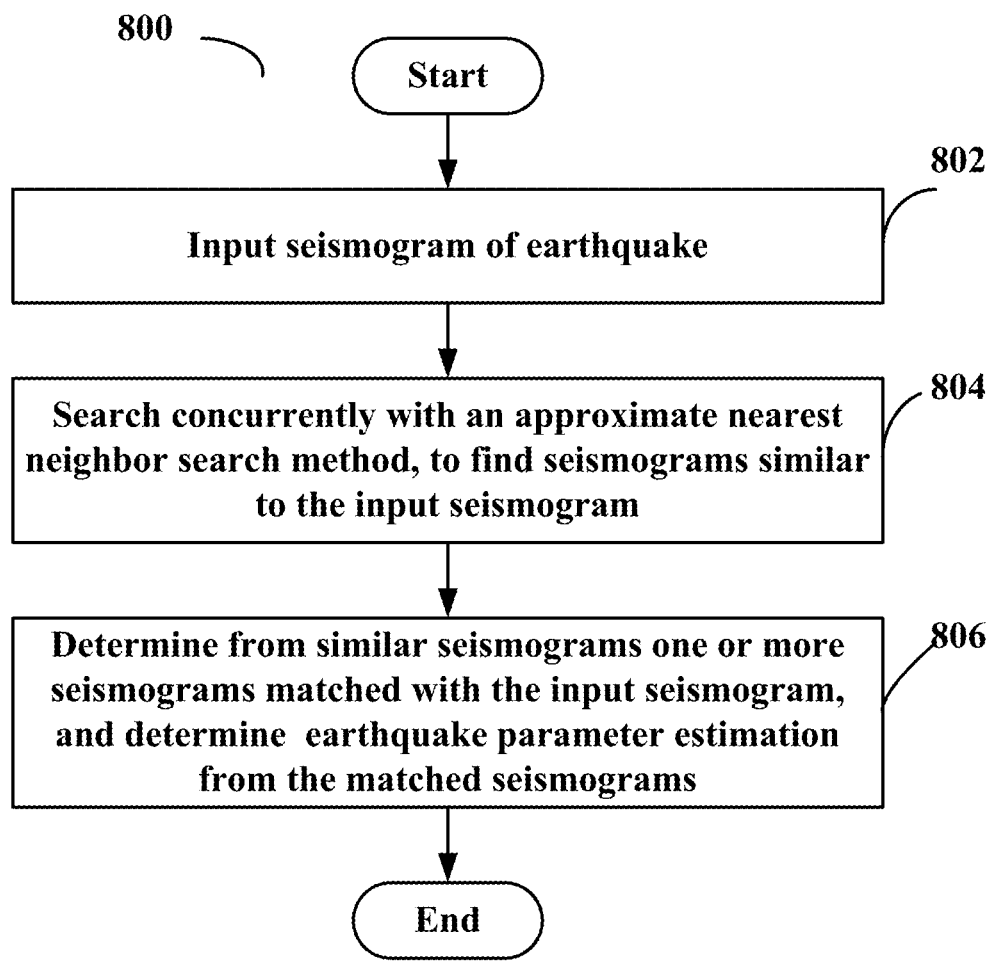
FIG. 10 is a flowchart showing a method of determining earthquake parameters for an earthquake according to an embodiment of the present invention.

FIG. 10 is a flowchart showing a method of determining earthquake parameters for an earthquake according to an embodiment of the present invention. The method 800 begins with step 802 of inputting a seismogram recorded for a happening or happened earthquake. The seismogram may include various waveforms, and may be recorded in one or more seismic stations. The seismogram may be pre-processed, for example, with noise removal, pick-up of P-wave initial arrival times and the like. These waveforms of the seismogram may be band-pass filtered into multiple frequency ranges, and then the arrival times of the maximum amplitudes of each waveform may be obtained. For each frequency ranges, the waveforms may be aligned according to the initial arrival times and the maximum amplitude arrival times, and thus two groups of waveforms for the input seismogram may be obtained.

At step 804, for each group of waveform, search may be performed concurrently in the historical seismogram database and theoretical seismogram database by use of an approximate nearest neighbor search method, to find a set of seismograms similar to the input seismogram according to a preset similarity condition. The seismograms in each database may be indexed as described with reference to FIG. 6, which shows a process of establishing two MRKD-Tree structures. As described above, at the dimensions 2 and 4, determination may be made as to whether the amplitude of each seismogram is larger or smaller than the mean values 0.3 and 0.6 at the root nodes, respectively. At the dimension 2, a seismogram having an amplitude less than 0.3 may be placed into the left half (ID=1, 2), while a seismogram having an amplitude not less than 0.3 may be placed into the right half (ID=3). For all the seismograms (ID=1, 2) in the left half, the maximum mean value is 0.65 at the dimension 4. After that, for the dimension 4, a seismogram having an amplitude less than 0.65 may be placed into the left half (ID=1), while a seismogram having an amplitude not less than 0.65 may be placed into the right half (ID=2). In this way, the Tree 1 is created. The Tree 2 in the right side is created in the same manner but beginning with the dimension 4.

Figure 7:
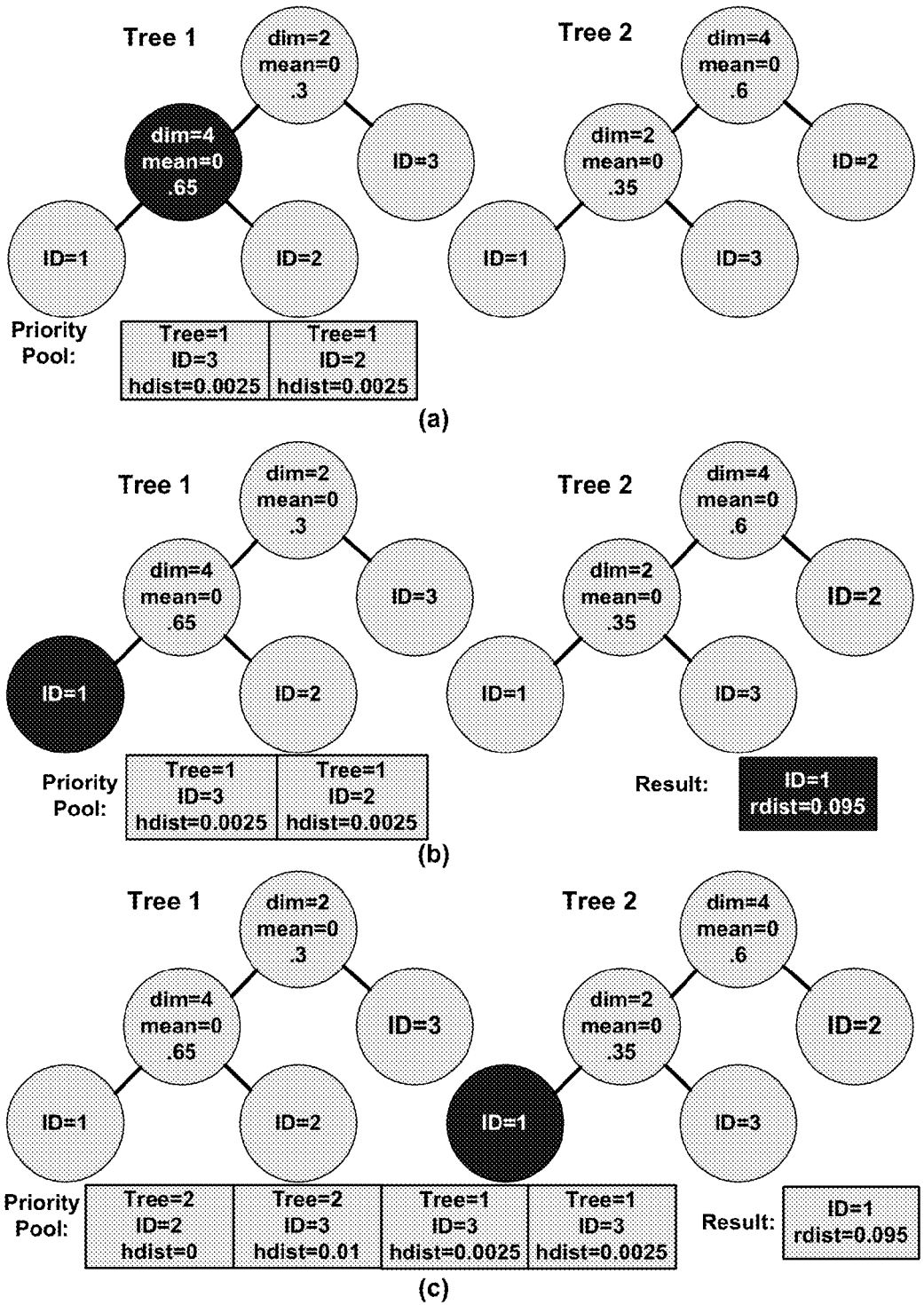
FIG. 7 shows a first round of search with the MRKD-Tree structure.
Figure 8:
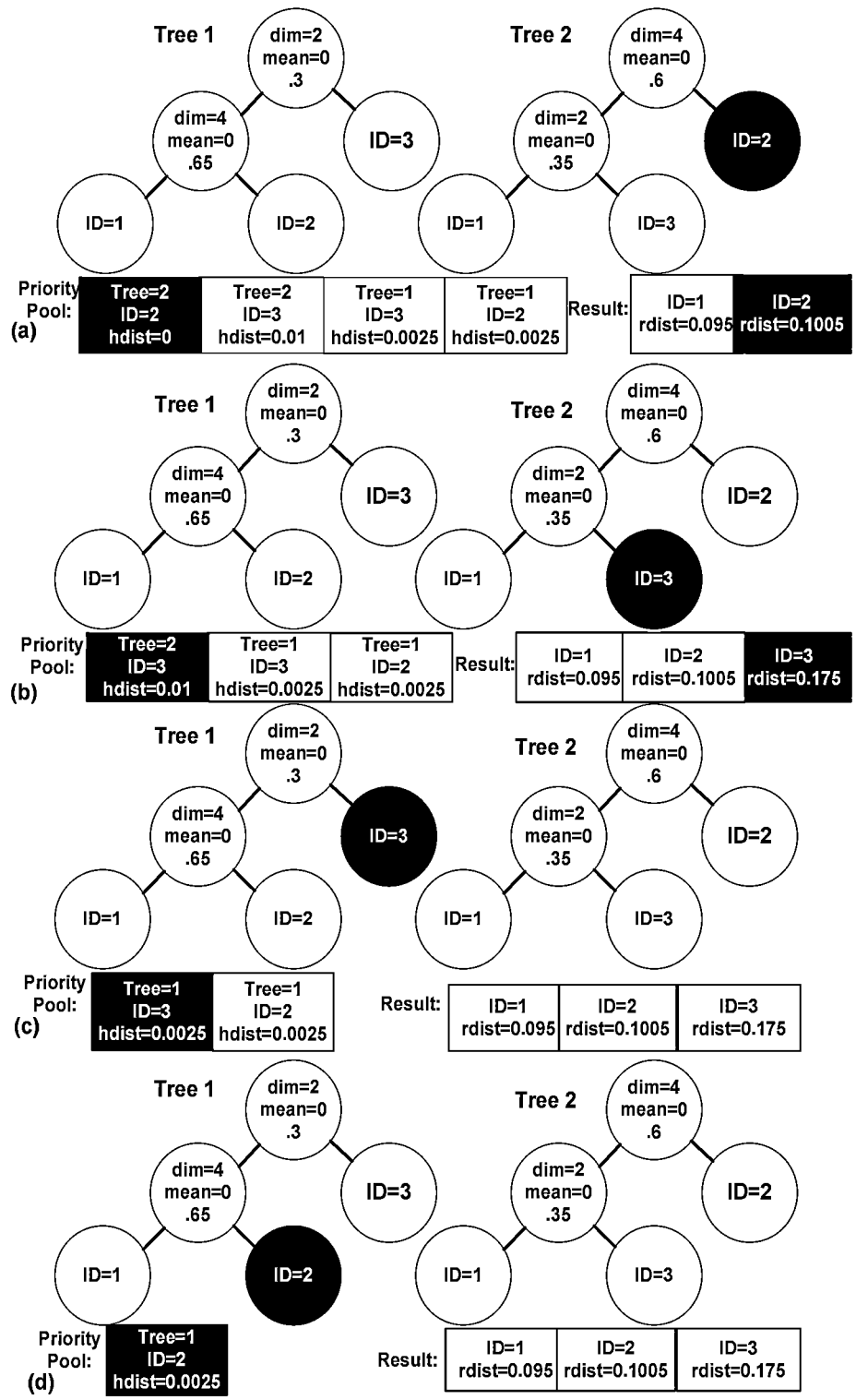
FIG. 8 shows a second round of search with the MRKD-Tree structure.

FIGS. 7 and 8 show a two-round search with the MRKD-Tree structure.

FIG. 7 shows the first round of search with the MRKD-Tree structure. The search starts with the root node of the MRKD-Tree structure. The "mean value" at the root node is compared with a value of the input seismogram at a "selected dimension". If the value at the "selected dimension" is less than the root node "mean value", the search will proceed to the left child node under the root node. At the same time, a so-called heuristic distance (hdist) is calculated between the input seismogram and the seismogram data at the right child node which will be inserted into a priority queue. If the value at the "selected dimension" is not less than the root node "mean value", the search will proceed to the right child node. At the same time, a so-called heuristic distance (hdist) is calculated between the input seismogram and the seismogram data at the left child node which will be inserted into a priority queue. As shown in part a) of FIG. 7, the search process proceeds to the node "selected dimension=4, mean value=0.65" of Tree 1, a heuristic distance is calculated for the node ID=3, and the node ID=3 is inserted into the priority queue. This process is repeated at each level of the MRKD-Tree structure, until the bottom leaf node is reached. The leaf node may be inserted into the priority queue, as shown in part b) of FIG. 7. If the priority queue has had a leaf node with the same ID number of the leaf node, the leaf node will not be inserted. Accordingly, the first round of search is completed in one tree. Such search may be performed in each tree in each group for each database. Part c) of FIG. 7 shows the result of the first round of search in Tree 2. The first round of search may be ended when all the MRKD-Tree structures in the databases have been searched.

FIG. 8 shows the second round of search with the MRKD-Tree structure. First, a node at the head of the priority queue (i.e., a node having the smallest heuristic distance) is taken. Based on the taken node, its corresponding tree ID (e.g., Tree 1 or Tree 2) and its position in the tree may be determined. Starting from this node, search is made in the same manner as the first round of search. Specifically, the "mean value" at this node is compared with a value of the input seismogram at a "selected dimension". If the value at the "selected dimension" is less than the node "mean value", the search will proceed to the left child node under the node. At the same time, a so-called heuristic distance (hdist) is calculated between the input seismogram and the seismogram data at the right child node which will be inserted into a priority queue. If the value at the "selected dimension" is not less than the node "mean value", the left and right child nodes are interchanged. In this way, search proceeds to each lower level of the tree until the leaf node is reached. The leaf node may be inserted into the priority queue, but will not be inserted if the queue has contained the leaf node. These processes are the same as in the first round of search. To be noted, if a upper limit is designated for the number of nodes contained in the priority queue, the foregoing search process may be ended if the number of nodes in the queue reaches the upper limit. Otherwise, the foregoing search process will be performed until all the nodes have been inserted into the queue. Parts a) to d) of FIG. 8 show a process of taking one node from the priority queue and starting search with the taken node.

For search with such MRKD-Tree structure, its basic theory and method may be found in the paper Silpa-Anan, C., and Hartley, R. (2008). Optimised KD-trees for fast image descriptor matching, In CVPR.

Referring back to FIG. 10, step 806 determines from the set of similar seismograms obtained at step 804 one or more seismograms matched with the input seismogram, and determines the earthquake parameters from the matched seismograms. The earthquake parameters include at least one of epicenter distance, source depth, source focal mechanism, and magnitude. In an embodiment, the method 800 may further include evaluating resolution and reliability of search results by comparing a distribution of cross correlation coefficients of all the matched seismograms.

Figure 11:
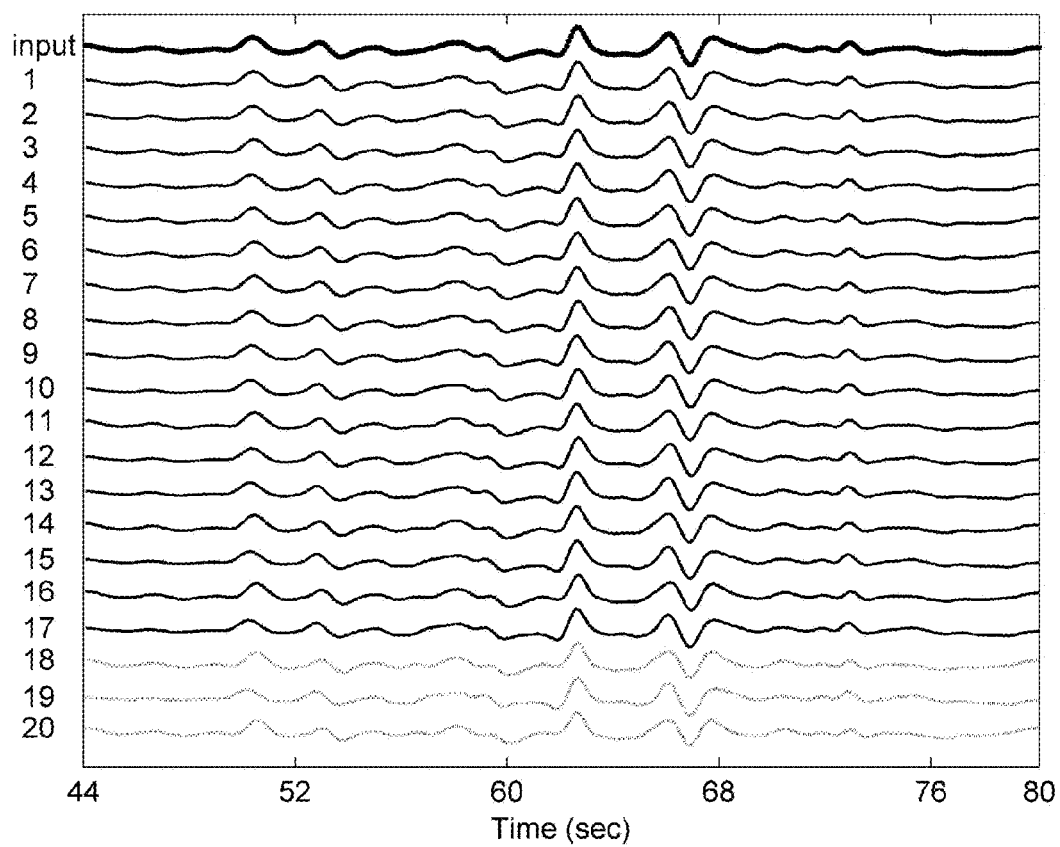
FIG. 11 shows an example of search results according to an embodiment of the present invention.

A simulated example to which the present disclosure is applied will be described. In this example, the earthquake parameters of an artificially synthesized earthquake will be estimated. Assumption is made that the synthesized earthquake has an epicenter distance of 300 km, a source depth of 25 km, and a source focal mechanism including a strike of 170°, a dip of 230° and a rake of 170°. In this example, the theoretical database may be gridded over on a region of an epicenter distance of 100 to 1000 km, a source depth of 5 to 30 km, and a source focal mechanism including a strike of 0 to 360°, a dip of 0 to 90° and a rake of −180° to 180°. Each grid corresponds to an interval of 5km in the epicenter distance, an interval of 5 km in the depth, an interval of 10° in each of strike, dip and rake. The waveforms of the seismogram of the artificially synthesized earthquake are inputted into the system 10 according to an embodiment of the present invention. FIG. 11 shows an example of search results including top 20 matched results obtained through the MRKD-Tree method. The uppermost seismogram is emphasized in bolded line, which has substantially the same waveform as the input synthesized earthquake seismogram. The 19 other seismograms are similar to the input seismogram.

Figure 12:
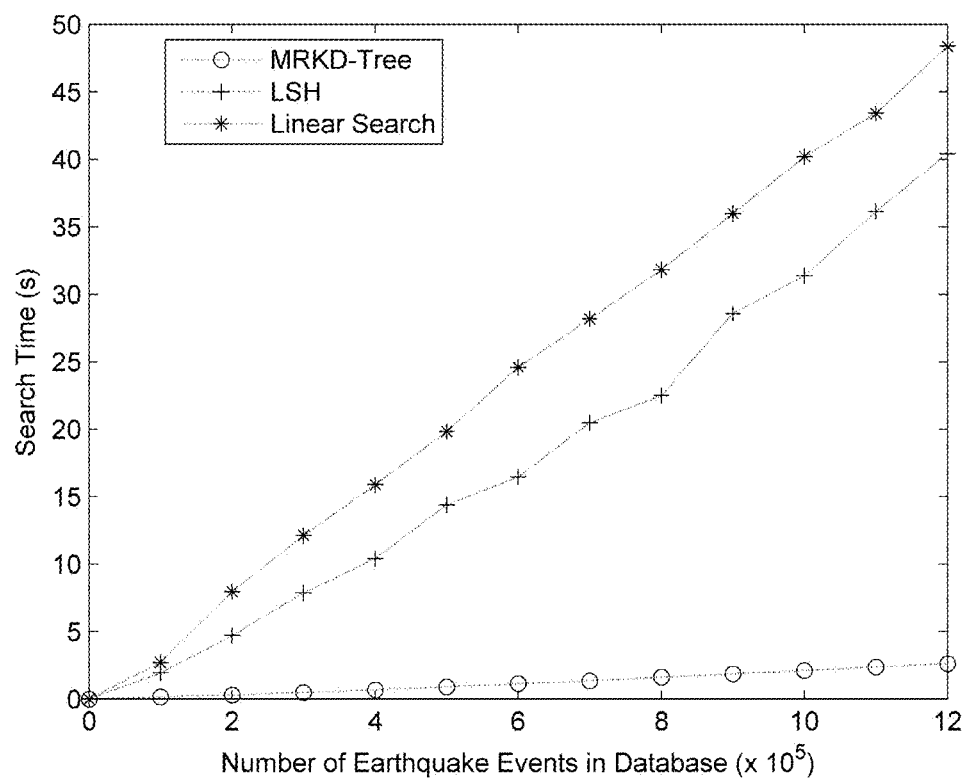
FIG. 12 shows comparison of seismogram search time among three methods, i.e., Linear Search method, Locality Sensitive Hashing (LSH) method, and MRKD-tree method.

FIG. 12 shows comparison of seismogram search time among three methods, i.e., Linear Search method, LSH method, and MRKD-tree method. By searching in the same database, the Linear search method returns 100 matched results with 100% accuracy but the longest search time. Both the LSH and MRKD-tree methods return results with 90% accuracy, and the time taken by the MRKD-tree method is far less than the time taken by each of the LSH and the Linear Search methods. For real applications, the 90% accuracy is more than sufficient. The MRKD-tree method is far more efficient, taking only a couple of seconds for searching through over a million of seismograms. This makes it possible to achieve rapid or even real-time estimation of earthquake parameters.

Figure 13:
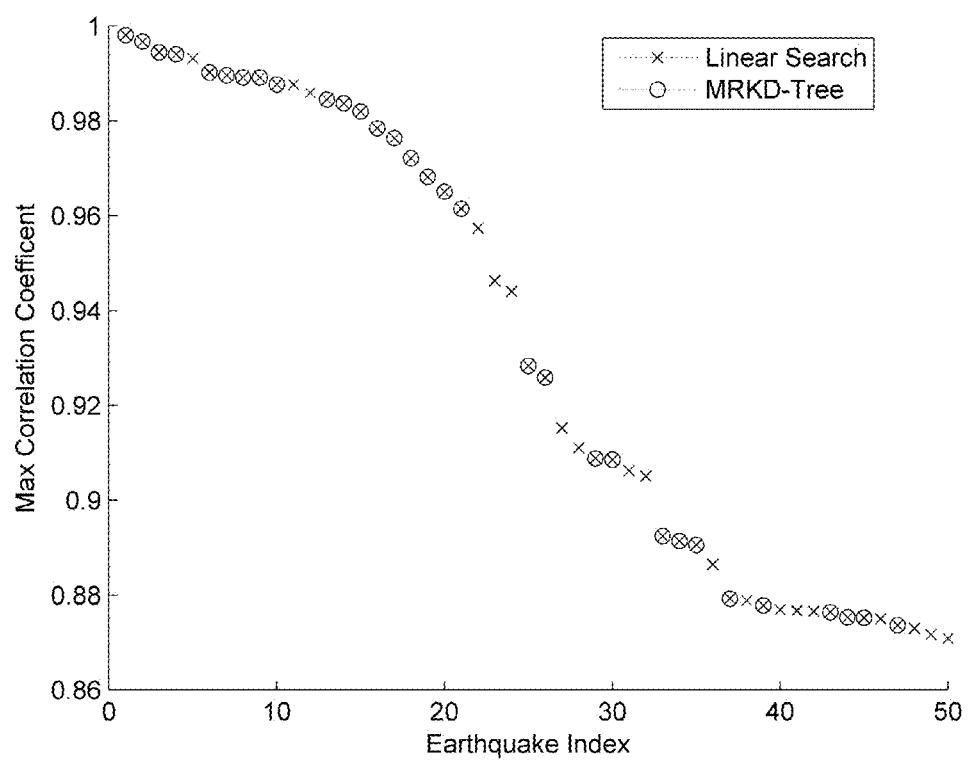
FIG. 13 shows comparison of maximum cross correlation coefficients between an input earthquake seismogram and its matched seismograms found by using Linear Search method and MRKD-tree method.

FIG. 13 shows comparison of maximum cross correlation coefficients between an input earthquake seismogram and its matched seismograms found by using Linear Search method and MRKD-tree method. As shown in FIG. 13, the Linear Search method finds 50 matched seismograms, while the MRKD-tree method misses some of the 50 results. However, for real applications, the MRKD-tree method is able to search and find many matched seismograms sufficient for statistical analysis. The MRKD-tree method is much higher in search speed and efficiency compared with the Linear Search method, and thus the methods and systems according to embodiments of the present invention has the advantage of almost real-time estimation of earthquake parameters.

Methods and systems of rapidly determining earthquake parameters of an earthquake and related search engines according to embodiments of the present invention have been described, which may determine estimation of parameters for an earthquake in a few second right after its records becoming available. It drives earthquake analyses with a search engine by creating large-scale databases that include both historical earthquake records and theoretical seismograms over a large range of earthquake parameters. Once matched seismograms to the input earthquake seismograms are found in the databases, the methods and systems immediately display information of these matched seismograms so that the source mechanism and other parameters of the earthquake are extracted right away. The methods and systems of the present invention may utilize computer search techniques, and may be applied to monitor microseismic events in oil and gas production environments, and/or nuclear exploration or dynamite explosion in real time.

The foregoing illustrates example embodiments of the present invention. An ordinary skilled person in the art will understand that various variations and modifications may be made within the principle and spirit of the present application, and all should fall within the scope of the present application.

What is claimed is:

1. A method of determining earthquake parameters for an earthquake, said method comprising:
inputting a seismogram of the earthquake at an interface for inputting the seismogram, the seismogram including earthquake waveforms;
searching concurrently, with a search engine that includes a processor, in pre-established historical seismogram database and theoretical seismogram database by use of an approximate nearest neighbor search method with waveform matching, to find a set of seismograms similar to the input seismogram according to a preset similarity condition, wherein the historical seismogram database stores seismograms of real earthquakes, and the theoretical seismogram database stores seismograms theoretically calculated; and determining, by the processor, from the set of similar seismograms, one or more seismograms matched with the input seismogram, and determining, by the processor, the earthquake parameters from the matched seismograms.

2. The method of claim 1, wherein the seismograms in the historical and theoretical seismogram databases are indexed so as to be searched by a Locality Sensitive Hashing (LSH) method.

3. The method of claim 1, wherein the seismograms in the historical and theoretical seismogram databases are indexed so as to be searched by a Multiple Randomized K-Dimensional (MRKD) tree method.

4. The method of claim 1, wherein the seismograms in the historical and theoretical seismogram databases are applied with band-pass filters with different frequency ranges and classified into the different frequency ranges, and for each frequency range, the waveforms of the seismograms are aligned based on their initial arrival times and their maximum amplitudes, to create two different groups of seismograms.

5. The method of claim 4, wherein for each of the historical and theoretical seismogram databases, each of the two groups is processed by a MRKD method to create one or more K-Dimensional (KD) trees, if multiple KD trees are created for one or each of the groups, said searching is performed in parallel on the multiple KD trees in the group.

6. The method of claim 5, wherein each of the seismograms are of multi-dimension, and said creating one or more KD trees for each group of seismograms comprises:

calculating a mean value and a variance of amplitudes of the seismograms at each dimension, determining one or more dimensions where the variances are largest relative to the mean values, for each of the one or more determined dimensions, dividing the seismograms into a left half and a right half with the mean value of the dimension being a median, wherein the left half includes the seismograms whose amplitudes are smaller than the mean value, and the right half includes the seismograms whose amplitudes are larger than the mean value;

for each of the left and right halves, iteratively perform said calculating, determining and dividing, until each half includes only a single seismogram.

7. The method of claim 5, wherein for each group in each of the historical and theoretical seismogram databases, the approximate nearest neighbor search method is applied to the one or more KD trees to find the set of similar seismograms, the similar seismograms are sorted as a sequence in a decreasing order of similarity to the input seismogram, wherein the similarity of each similar seismogram is defined as cross correlation coefficient between the seismogram and the input seismogram, and several sorted seismograms at the head part of the sequence are selected as approximate nearest neighbors of the input seismogram.

8. The method of claim 1, wherein the theoretical seismogram database are established by gridding earthquake parameters over selected ranges, and for each grid, calculating theoretical seismograms.

9. The method of claim 1, wherein said determining the matched seismograms comprising, for each group in each of the historical and theoretical seismogram databases, calculating a cross correlation coefficient between each of the seismograms selected as approximate nearest neighbors and the input seismogram, and determining one or more seismograms having the largest cross correlation coefficient as the matched seismograms.

10. The method of claim 1, wherein the preset similarity condition includes a preset search accuracy.

11. The method of claim 1, further comprising evaluating resolution and reliability of search results by comparing a distribution of cross correlation coefficients of all the matched seismograms.

12. The method of claim 1, wherein the historical and theoretical seismogram databases are created from earthquake parameters recorded at one or more seismic stations, if earthquake parameters recorded at multiple seismic stations are used, the earthquake parameters are determined for each seismic station, and an intersection of all the earthquake parameters are determined as the final earthquake parameters.

13. The method of claim 1, wherein if the cross correlation coefficients between the input seismogram and the matched seismograms from the historical and theoretical seismogram databases, respectively, are same or close, the matched seismograms from the historical seismogram database are selected for the final earthquake parameters.

14. The method of claim 1, wherein earthquake parameters include at least one of epicenter distance, source depth, source focal mechanism, and magnitude.

15. A system of determining earthquake parameters for an earthquake, said system comprising:

a historical seismogram database which stores seismograms of real earthquakes;

a theoretical seismogram database which stores seismograms theoretically calculated;

an interface configured to receive a seismogram of an earthquake, the seismogram including earthquake waveforms;

an earthquake search engine that includes a processor, the earthquake search engine configured to search concurrently in the historical seismogram database and the theoretical seismogram database by use of an approximate nearest neighbor search method with waveform matching, to find a set of seismograms similar to the input seismogram according to a preset similarity condition, to determine from the set of similar seismograms one or more seismograms matched with the input seismogram, and to determine the earthquake parameters from the matched seismograms.

16. The system of claim 15, wherein the seismograms in the historical and theoretical seismogram databases are applied with band-pass filters with different frequency ranges and classified into the different frequency ranges, and for each frequency range, the waveforms of the seismograms are aligned based on their initial arrival times and their maximum amplitudes, to create two different groups of seismograms.

17. The method of claim 16, wherein for each of the historical and theoretical seismogram databases, each of the two groups is processed by a MRKD method to create one or more K-Dimensional (KD) trees, if multiple KD trees are created for one or each of the groups, the earthquake search engine performs search in parallel on the multiple KD trees in the group.

18. The system of claim 17, wherein for each group in each of the historical and theoretical seismogram databases, the earthquake search engine applies the approximate nearest neighbor search method to the one or more KD trees to find the set of similar seismograms, sorts the similar seismograms as a sequence in a decreasing order of similarity to the input seismogram, wherein the similarity of each similar seismogram being defined as cross correlation coefficient between the seismogram and the input seismogram, and selects several sorted seismograms at the head part of the sequence are selected as approximate nearest neighbors of the input seismogram.

19. The system of claim 15, wherein the earthquake search engine determines the matched seismograms by, for each group in each of the historical and theoretical seismogram databases, calculating a cross correlation coefficient between each of the seismograms selected as approximate nearest neighbors and the input seismogram, and determining one or more seismograms having the largest cross correlation coefficient as the matched seismograms.

20. An earthquake search engine, comprising:
a processor;
a search unit configured to search concurrently in a pre-established historical seismogram database and a theoretical seismogram database by use of an approximate nearest neighbor search method with waveform matching, to find a set of seismograms similar to an input seismogram including earthquake waveforms according to a preset similarity condition, wherein the historical seismogram database stores seismograms of real earthquakes, and the theoretical seismogram database stores seismograms theoretically calculated; and
a determination unit configured to determine from the set of similar seismograms one or more seismograms matched with the input seismogram, and determine earthquake parameters from the matched seismograms.

\* \* \* \* \*